(12) United States Patent
Toure et al.

(10) Patent No.: US 11,121,549 B2
(45) Date of Patent: Sep. 14, 2021

(54) POWER FLOW CONTROL DEVICE FOR CONTROLLING THE DISTRIBUTION OF CURRENTS IN A MESH NETWORK

(71) Applicants: Supergrid Institute, Villeurbanne (FR); Ecole Centrale De Lyon, Ecully (FR)

(72) Inventors: Selle Toure, Lyons (FR); Florent Morel, Lyons (FR); Serge Poullain, Lyons (FR)

(73) Assignees: Supergrid Institute, Villeurbanne (FR); Ecole Centrale De Lyon, Ecully (FR)

( * ) Notice: Subject to any disclaimer, the term of this patent is extended or adjusted under 35 U.S.C. 154(b) by 0 days.

(21) Appl. No.: 16/630,732

(22) PCT Filed: Jul. 13, 2018

(86) PCT No.: PCT/FR2018/051776
§ 371 (c)(1),
(2) Date: Jan. 13, 2020

(87) PCT Pub. No.: WO2019/016449
PCT Pub. Date: Jan. 24, 2019

(65) Prior Publication Data
US 2021/0083473 A1  Mar. 18, 2021

(30) Foreign Application Priority Data
Jul. 20, 2017  (FR) ...................... 1756880

(51) Int. Cl.
H02J 7/34   (2006.01)
H02J 1/10   (2006.01)
H02J 3/38   (2006.01)
H02J 3/46   (2006.01)

(52) U.S. Cl.
CPC .............. *H02J 1/102* (2013.01); *H02J 3/46* (2013.01)

(58) Field of Classification Search
CPC ...... H02J 1/102; H02J 3/46; H02J 1/14; H02J 13/0003; H02J 1/10
See application file for complete search history.

(56) References Cited

U.S. PATENT DOCUMENTS

2008/0284248 A1* 11/2008 Raulin ................ H02M 3/1582
307/20
2015/0180231 A1*  6/2015 Whitehouse ............ H02J 3/36
307/24

FOREIGN PATENT DOCUMENTS

| EP | 2670013 A1 | 12/2013 |
| EP | 3007300 A1 | 4/2016 |
| EP | 3007301 A1 | 4/2016 |
| WO | WO 2010115452 A1 | 10/2010 |

(Continued)

*Primary Examiner* — Hal Kaplan
*Assistant Examiner* — Rasem Mourad
(74) *Attorney, Agent, or Firm* — Gable Gotwals

(57) ABSTRACT

A power flow control device intended to be used in a mesh network. The device includes a first voltage source connected between a first terminal (B1) and a third terminal (B3). A second voltage source is connected between a second terminal (B2) and the third terminal (B3). A current source is connected alternately to the first voltage source and the second voltage source and configured to ensure a transfer of energy between the first voltage source and the second voltage source. A switching means is arranged to allow the current source to be connected alternately in parallel with the first voltage source or in parallel with the second current source.

9 Claims, 12 Drawing Sheets

(56) References Cited

FOREIGN PATENT DOCUMENTS

| | | |
|---|---|---|
| WO | WO 2010115453 A1 | 10/2010 |
| WO | WO 2012037957 A1 | 3/2012 |
| WO | WO 2013 13858 A1 | 1/2013 |
| WO | WO 2013178807 A1 | 12/2013 |

* cited by examiner

POWER FLOW CONTROL DEVICE FOR CONTROLLING THE DISTRIBUTION OF CURRENTS IN A MESH NETWORK

CROSS-REFERENCE TO RELATED APPLICATIONS

This application is the United States National Phase of PCT Patent Application No. PCT/FR2018/051776 filed on 13 Jul. 2018, which claims priority to French Patent Application No. 1756880 filed 20 Jul. 2017, both of which are incorporated herein by reference.

TECHNICAL DOMAIN OF THE INVENTION

This invention concerns a power flow control device meant to be used in a mesh network. The invented device can particularly be used in a high voltage direct current mesh network.

STATE OF THE ART

A network is a set of overhead lines or cables hereinafter referred to as "links" which are meant to connect devices (or terminals) to each other in order for them to exchange energy. In a direct current network, the devices which supply or consume energy are generally electronic power converters called "converter stations".

If the network is meshed, the current has several possible paths to go from one converter station to another. The currents in the links are distributed based on the characteristics of the links (this characteristic in direct current networks is the resistor of the link).

FIG. 1 shows a mesh network having just a single mesh. This network thus comprises three nodes which are each at a specific voltage and three links: the first link connecting the first node to the second node, the second link connecting the first node to the third node and the third link connecting the second node to the third node.

For example, on the network represented in FIG. 1, the three voltages $V_a$, $V_b$ and $V_c$ represent the voltages imposed by converter stations. The three resistors R1, R2 and R3 represent the resistors of the links.

Each converter station can inject or extract power from the network. In this configuration, the currents ($I_1$, $I_2$, $I_3$) in each link are not controlled by converter stations. In fact, each converter station imposes a specific voltage to the network and the node to which it is connected. While the current in each converter station is lower than its maximum current, it is possible to reach operating points where a link transmits current that is higher than its maximum current while other links in the network (which could be used to transfer energy) are under-loaded.
In an architecture such as that which is represented in FIG. 1, in the case where the converter stations B and C supply energy to the network and the converter station A receives energy, the current has two possible paths moving from station B to station A:
  It can pass directly through the first link 11 or,
  It can pass through both links 13 and 12.
Its path will particularly be determined based on the values of the resistors of the links and the voltages imposed by the converter stations of the network.

Solutions have already been proposed by previous technical inventions to ensure a better distribution of the current in the links of a mesh network.

One solution which is by the way described in patent application WO2012/037957A1 consists in inserting an electronic power converter in order to modify the voltage at one end of a link.

Other solutions consist in inserting a voltage source in series with a link, as shown by the diagram in FIG. 2. Adjusting this voltage makes it possible to modify the distribution of the currents in the network. For this to be done, different architectures have been described in patent applications WO2010/115452A1, WO2013/013858A1.

Converters that add a voltage source in series with two alternating links have equally been described in applications EP3007301A1 and EP3007300A1. However, this type of structure has some limitations: the currents ($I_{IN1}$ and $I_{IN2}$ in these documents) must be of the same sign ($I_c$ is equal to $I_{IN1}$ and to $-I_{IN2}$ alternately), the structure is not extensible to the case where more than two links are connected to the third link ($I_{OUT}$) and generates more harmonics in operation.

Another solution described in patent application WO2013/178807A1 and diagrammatically represented in FIG. 3 consists in inserting two voltage sources ($V_{x1}$, $V_{x2}$) in series each having a separate link and a voltage source ($V_{x0}$) in series with a converter station. In this diagram, the double arrows indicate the possibility of energy exchange between the sources.

This type of solution presents three levels of freedom while the system must satisfy only two constraints:
  $V_x = V_{x1} - V_{x2}$ which regulates the current in the links, and
  The equality of steady power supply $V_{x1}I_1 + V_{x2}I_2 - V_{x0}I_a = 0$ (considering a yield of 1).
It therefore presents more levels of freedom than necessary and therefore turns out to be more complex than necessary.

The first purpose of the invention is to propose a solution which makes it possible to increase the transport capacity of such a mesh network and to avoid the congestion of links (current higher than the nominal current) without having to integrate new links.

The second purpose of the invention is to propose a power flow control device which serves the first purpose and is equally intended to be connected in a direct current mesh network, this device being:
  Simple with less costly architecture,
  Easy to install and control,
  Adaptable to different architectures and operating modes of the mesh network.
The device of the invention will also be adapted to operate in an alternating current mesh network.
Presentation of the Invention
These two objectives are achieved by a power flow control device intended to be used in a DC mesh network, a mesh comprised of at least three nodes, each with a specific voltage and three links; the first link connecting the first node to the second node, the second link connecting the first node to the third node and the third link connecting the second node to the third node. The said device being described as having:
  A first terminal meant to be connected in series on the first link, a second terminal meant to be connected in series on the second link and a third terminal meant to be connected to the first node,
  A first voltage source connected between its first terminal and its third terminal and comprising at least a first capacitor,
  A second voltage source connected between its second terminal and its third terminal comprising at least a second capacitor, A current source alternately connected to the first voltage source and the second voltage source and configured to provide energy transfer between the first voltage source and the second voltage source, the said current source comprising at least an inductance, Switching means arranged to allow for an alternate connection of the said alternating current source, in parallel with the first voltage source or in parallel with the second voltage source, the said switching means comprising:

A first set of two first switches connected between the first terminal and the third terminal of the device, in parallel with the first voltage source, the two switches of the first set establishing a first connection midpoint between them;

A second set of two second switches connected between the second terminal and the third terminal, in parallel with the second voltage source, the two switches of the second set establishing a second connection midpoint between them;

A third switch connected between the second terminal and the first connection midpoint of the first set of switches;

A fourth switch connected between the first terminal and the second midpoint of the second set of switches.

Control means configured to control said switching means so as to carry out the said connection of the afferent alternating current source, in parallel with the first voltage source or in parallel with the second voltage source and controlling energy transfer between the first voltage source and the second source voltage via the said current source.

According to a particular design, the first voltage source shall comprise at least one capacitor.

According to a particular design, the second voltage source shall comprise at least one capacitor.

According to a particular design, the current source shall comprise at least one inductance.

According to a particular design, the afferent switching means shall comprise six switches:

A first set of two first switches, connected between the first terminal and the third terminal of the device, in parallel with the first voltage source, the two switches of the first set establishing a first connection midpoint between them;

A second set of two second switches, connected between the second terminal and the third terminal, in parallel with the second voltage source, the two switches of the second set establishing a second connection midpoint between them;

A third switch connected between the second terminal and the first midpoint of the first set of switches;

A fourth switch connected between the first terminal and the second midpoint of the second set of switches.

According to a particular design, the inductance is connected between the first midpoint and the second midpoint.

According to a particular design, each switch is chosen according to the sign of the following parameters:

Current $I_1$;
Current $I_2$;
The ratio $I_1/I_2$;
The difference $I_1-I_2$;
The difference $V_x=V_1-V_2$;

The ratio $$\frac{V1-V2}{I1+I2};$$

In which:
$I_1$ corresponds to the current flowing in the first link;
$I_2$ corresponds to the current flowing in the second link;
$V_1$ corresponds to the voltage across the first voltage source;
$V_2$ corresponds to the voltage across the second voltage source;

According to another particular design, each switch is chosen from:
An open circuit;
A short-circuit;
A diode;
A non-reversible control switch;
A current reversible control switch;
A voltage reversible control switch;
A current and voltage reversible switch;
A single mechanical switch;
A mechanical switch in series with a diode;
A mechanical switch in series with a control switch;

According to a particular design, the said switching means and the said current source are distributed in several identical conversion blocks, and in that it comprises a first conversion block connected separately to the first terminal, to the second terminal and to the third terminal.

According to a particular design, the device has a system for bypassing said device, controlled by said control means and comprising switching means arranged in parallel with each voltage source.

According to a particular design, the said bypass system includes means for discharging each voltage source.

The invention also relates to the use of the device as defined above in a DC mesh network, the said network comprising at least three nodes which are each at a determined voltage and three links; the first link connecting the first node to the second node, the second link connecting the first node to the third node and the third link connecting the second node to the third node.

Moreover, the device may be adapted to achieve other objectives, such as:
To distribute the currents in the network so as to minimize losses;
To control the distribution of the current in links, and thus for example to disconnect the current in a link in order to open a contactor for a network reconfiguration operation for example;
To balance the currents in the links, particularly in a mixed network scenario (bipolar/monopolar ("tap converters" inserted in a bipolar network for example));

BRIEF DESCRIPTION OF THE FIGURES

Other characteristics and advantages will be evoked in the detailed description which follows, made with reference to the appended diagrams in which.

DETAILED DESCRIPTION OF AT LEAST ONE DESIGN

The power flow control device of the invention is intended to be used in a mesh network, preferably a high voltage DC network. According to its configuration, it can also be used in an AC mesh network. It will be seen that such is the case when the switching means is comprised of reversible current and voltage power switches.

As already mentioned above in reference to FIG. 1, a mesh network, in its simplest representation, is presented in the form of three interconnected nodes.

Each node is advantageously connected directly or indirectly to one or more converter stations. The converter station A is thus connected to the first node. The converter station B is thus connected to the second node of the network. The converter station C is therefore connected to the third node of the network.

Each converter station is intended to either inject power into the network or extract power from the network.

Each converter station is intended to either inject a current into the network or extract a current from the mesh network. For the converter station A, it is the current $I_a$, for the converter station B it is the current $I_b$ and the current $I_c$ for converter station C.

A voltage is imposed on each node by the station connected to the node. The voltage $V_a$ is applied to the first node of the network. The voltage $V_b$ is applied to the second node of the network. The voltage $V_c$ is applied to the third node of the network.

A first link 11 connects the first node to the second node. A second link 12 connects the first node to the third node. A third link 13 connects the second node to the third node.

Each link may be formed by an overhead line, a cable or any other means used to transport current.

Figure 1:
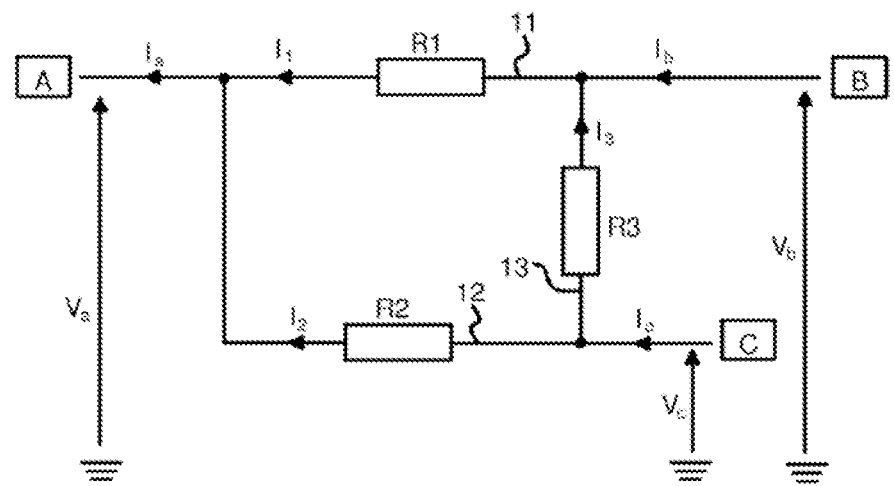
FIG. 1 represents a minimal mesh network with a single mesh.
Figure 2:
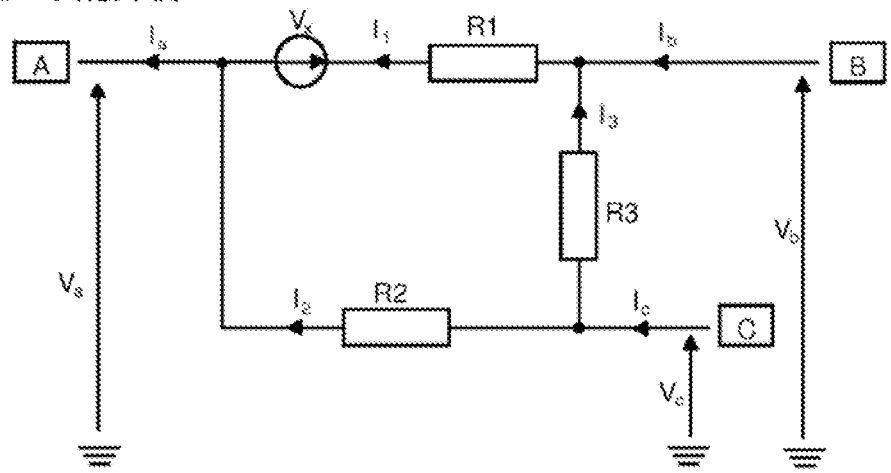
FIGS. 2 and 3 schematically represent solutions known in the technical structure.
Figure 3:
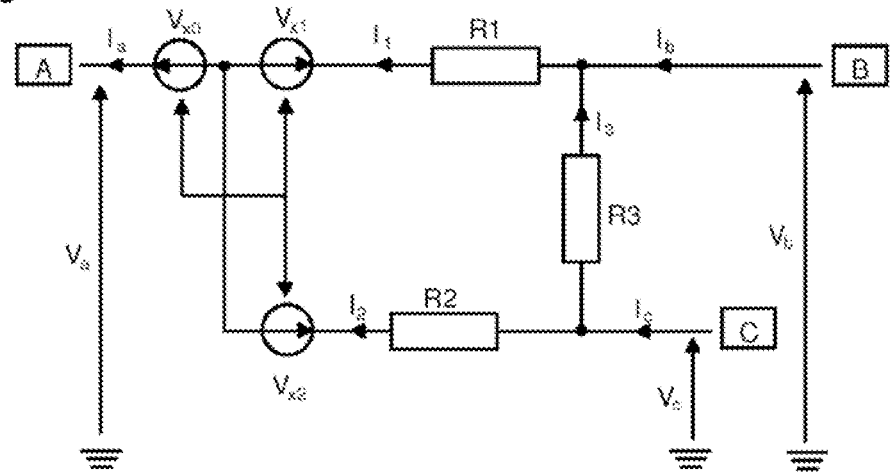

As already described above, in a configuration where stations B and C provide energy on the mesh network and where station A receives this energy, the currents $I_b$ and $I_a$ can have two paths to get to station A. FIG. 1 therefore has three currents $I_1$, $I_2$ and $I_3$ flowing on each link of the network.

Figure 4A:
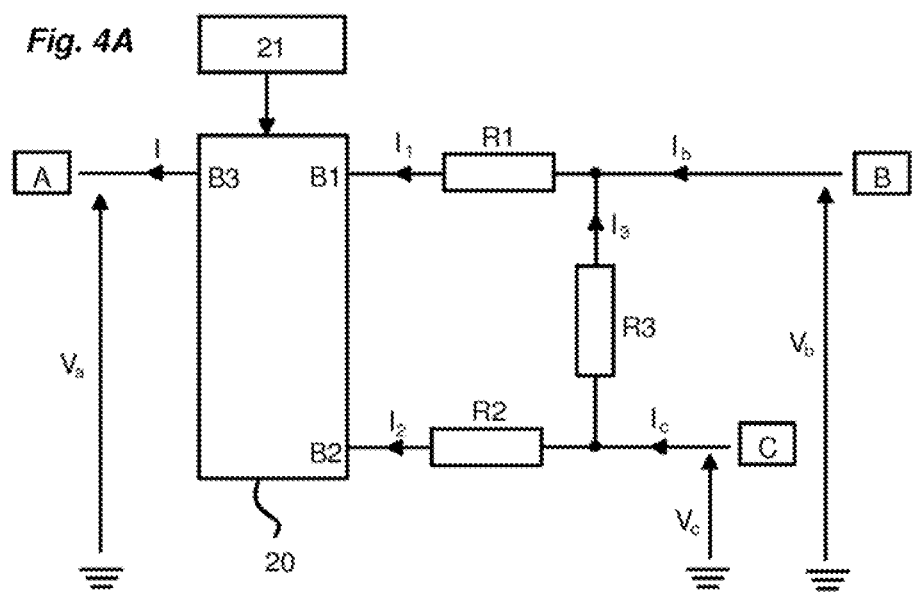
FIG. 4A shows schematically the power flow control device of the invention incorporated in a mesh network.
Figure 4B:
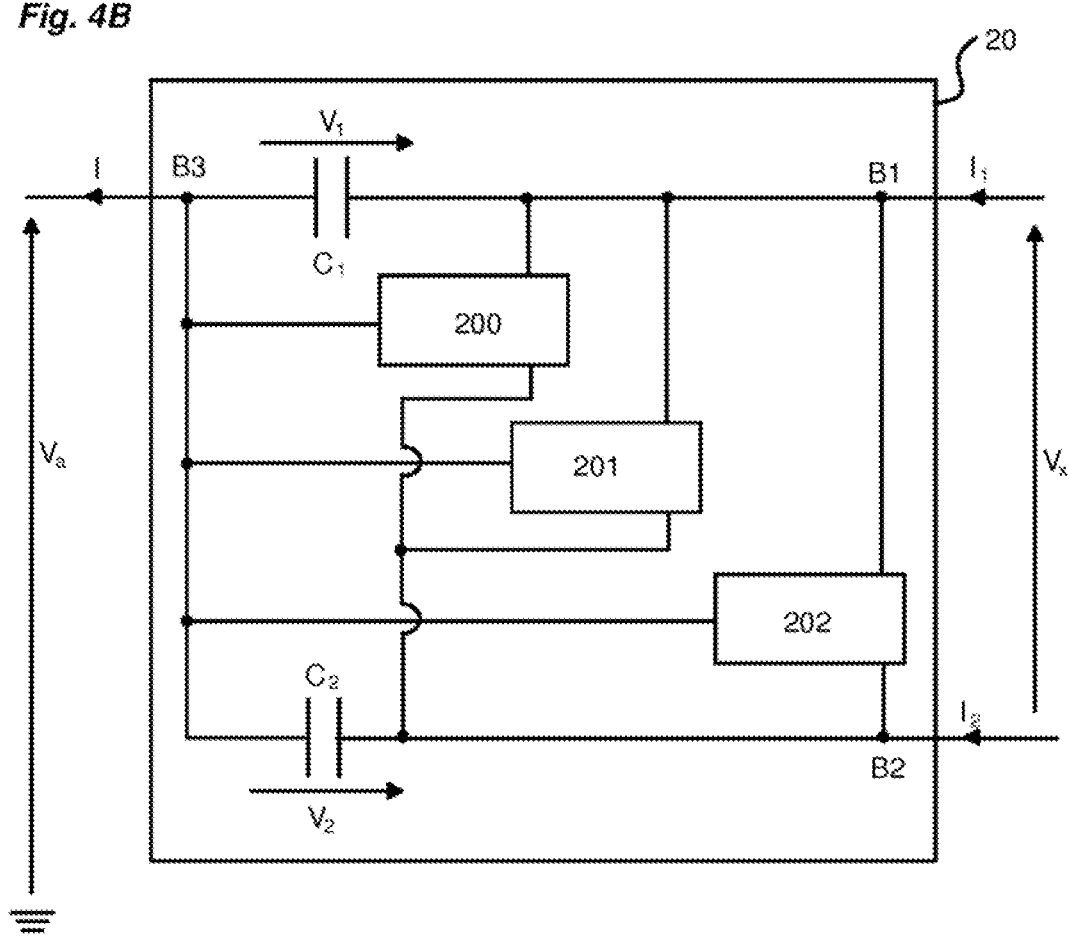
FIG. 4B schematically represents an exemplary design of the power flow control device of the invention, incorporated in the mesh network.
Figure 5:
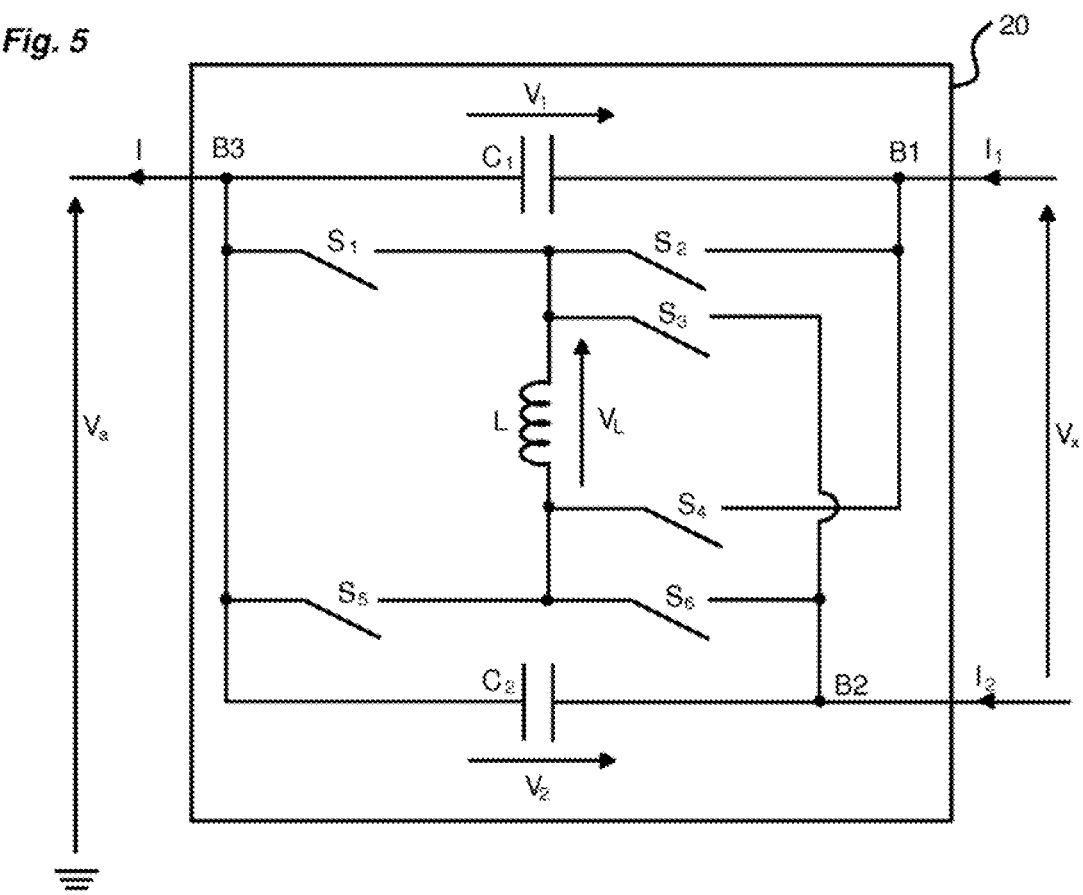
FIG. 5 represents the general architecture of the power flow control device of the invention incorporated in a mesh network.

With reference to FIGS. 4A, 4B and 5, the device 20 of the invention comprises:

A first terminal B1 meant to be connected to the first link, a second terminal B2 meant to be connected to the second link and a third terminal B3 meant to be connected to the first node;

A first voltage source connected between its first terminal and its third terminal;

A second voltage source connected between its second terminal and its third terminal;

A current source (represented as an inductance) connected to the first voltage source (represented as a capacitor) and to the second voltage source (represented as a capacitor) and used to ensure a transfer of energy between the first voltage source and the second voltage source;

Switching means arranged such as to enable a connection of the said current source in a specific configuration. Looking at a particular feature of the invention, it has to do with connecting the current source, alternately, in parallel with the first voltage source or in parallel with the second voltage source;

Control means 21 configured to control the said switching means so as to ensure the connection of the said alternating current source, in parallel with the first voltage source or in parallel with the second voltage source and command a transfer of energy between the first voltage source and the second voltage source via the said current source;

Of course, we must consider that the three terminals B1, B2, B3 are equivalent. The connection of the three terminals B1, B2, B3 of the device to the three links 11, 12, 13 respectively is therefore unlimited. The device can be inserted into the network so as to connect its terminals to the links differently. Given that the device has three terminals and that the network has three links, there will thus be six permanent connection configurations of the device in the network.

The said control means 21 are not detailed in the present application. They advantageously include a processing unit intended to generate control signals for alternating control and optionally control units ("drivers") adapted to the switching means used. These control means advantageously form part of the device 20 of the invention.

The first voltage source may have at least a first capacitor $C_1$ having a determined capacity.

The second voltage source may have at least a second capacitor $C_2$ having a determined capacity.

The current source may include an inductor L.

The switching means shall particularly have one or more electronic power switches.

The two capacitors $C_1$, $C_2$ are both connected to the third terminal B3 of the device 20 and have their other terminal connected respectively to the first terminal B1 and to the second terminal B2 of the device so as to connect to the two links 11, 12 whose currents we want to control ($I_1$, $I_2$).

In an alternate design, one of the two capacitors ($C_1$, $C_2$) could be connected between the terminals B1 and B2 while the other capacitor would remain connected between terminals B1 and B3 or B2 and B3.

The composition of the electronic power switches and their positioning depends on the signs of the currents ($I_1$ and $I_2$) which circulate in the links on the one hand, and on the sign of the voltage ($V_x=V_1-V_2$) which must be inserted in the mesh whose current wants to be controlled on the other hand. The structure of the switching means is therefore chosen based on the network in which the device will be inserted and the expected operating points.

FIG. 4B represents a particular design of the device which comprises several identical conversion blocks. Each conversion block 200, 201, 202 has three terminals, each being connected separately to terminal B1, terminal B2 and terminal B3 respectively.

The three conversion blocks are identical and each of them has at least an inductor and a switching means. The architecture of each conversion block and their association in the device makes it possible in particular to carry out all the layouts which will be described below, to meet the needs of all possible operating cases or requirements.

This modular architecture with several identical conversion blocks makes it particularly possible to ensure operation in degraded mode if a block is faulty and to reduce manufacturing costs with the production of a particular converter by combining elementary converters produced in series.

Furthermore, this architecture, thanks to the command option, presents certain advantages in terms of oscillations in the currents in the links and in the voltages across the capacitors. It is therefore possible to easily shift the commands of the conversion blocks 200, 201, 202 from one to another (N controlled blocks with a period T with orders shifted of T/N). It is also possible to couple the inductances (on the same magnetic circuit) of the conversion blocks, making it possible to limit the number of magnetic circuits used.

In the continuation of the description and the accompanying diagrams, a transistor should be understood as being either a single transistor or several transistors placed in series and/or in parallel to ensure the operation of the device. It is the same for each diode which could equally be a group of several diodes connected in series and/or in parallel, or each capacitor which could be a group of several capacitors connected in series and/or in parallel.

In a bipolar network or in a symmetrical monopolar network, the structure of the proposed device is to be installed on the two poles.

In the most general architecture of the device, as presented in FIG. 5, the switching means is comprised of an array of six switches:
- A first set of two switches $S_1$, $S_2$ connected between the first terminal B1 and the third terminal B3 of the device 20 (parallel to the first voltage source, i.e. the first capacitor $C_1$), the two switches $S_1$, $S_2$ establishing between them a first connection midpoint;
- A second set of two switches $S_5$, $S_6$ connected between the second terminal B2 and the third terminal B3 (parallel to the second voltage source, i.e. the second capacitor $C_2$), the two switches $S_5$, $S_6$ establishing between them a second connection midpoint;
- A switch $S_3$ connected between the second terminal B2 of the device 20 and the first midpoint of the first set of switches;
- A switch $S_4$ connected between the first terminal B1 of the device 20 and the second midpoint of the second set of switches;

In this general architecture, the inductance L is connected between the first midpoint and the second midpoint.

Each switch of the switching means can then be chosen according to the sign of the following values:
Current $I_1$;
Current $I_2$;
The ratio $I_1/I_2$;
The difference $I_1-I_2$;
The difference $V_x=V_1-V_2$;
The ratio $$\frac{V1-V2}{I1+I2};$$

The signs of these values define what is hereinafter referred to as an "operating case". Moreover, some switches specified in the general architecture can be deleted (open circuit) depending on the number of operating cases desired.

With reference to FIGS. 6A to 6I, several architectures are thus proposed to meet the requirements of different operating cases. Of course, it should be understood that the list of cases described below is not exhaustive and that other cases can very well be conceived. Some adaptations will then be necessary to arrive at an optimal device making it possible in particular to take into account the number of operating cases desired. In the different cases described below, the references reported on the drawings are maintained from one design to another insofar as the components remain at least identical in their functioning.

In each operating case, the switches $S_1$ to $S_6$ are chosen according to a particular design in order to respond to the expressed need. In a non-exhaustive and unrestricted way, each switch will then be chosen based on one of the layouts listed below:
An open circuit (i.e. no electrical link);
A short circuit (i.e. a permanent connection);
A diode;
A non-reversible controlled switch (for example: IGBT or BJT);
A reversible current control switch (for example: IGBT with diode in parallel or MOSFET);
A voltage reversible control switch (For example: IGBT and diode in series);
A current and voltage reversible switch (For example: two IGBTs with diode in series);
A single mechanical switch;
A mechanical switch in series with a diode;
A mechanical switch in series with a controlled switch;
Possibly a combination of several of these designs;

A first series of designs presented below relates to the fact that the currents $I_1$ and $I_2$ are always of identical signs.

Figure 6A:
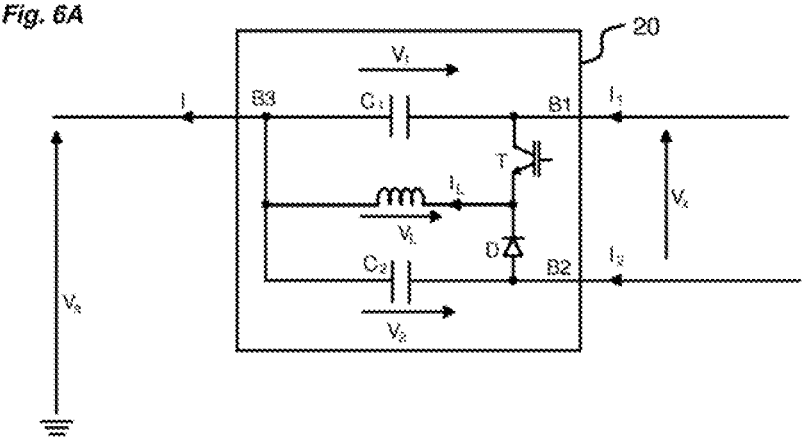
FIGS. 6A to 6I represent several designs of the power flow control device of the invention responding to a first series of needs.

Case where $I_1>0$, $I_2>0$ and $V_x>0$—FIG. 6A

In this layout, we have:
$S_1$=Open circuit
$S_2$=IGBT
$S_3$=Diode
$S_4$=Open circuit
$S_5$=Short circuit
$S_6$=Open circuit In the FIG. 6A, the transistor T could be a bipolar transistor, a metal-oxide-semiconductor field-effect transistor (MOSFET), a GTO transistor (possibly asymmetric, i.e. which is not adapted to support reverse voltages) or an IGCT (possibly asymmetric).

The transistor T is controlled on closing with a duty cycle $\alpha$. When the transistor T is on, we have $V_L=V_1$. When the transistor is open, with the assumption that the current in the inductance never vanishes, the diode D is on, we have $V_1=V_2$. In a steady-state, the average voltage at the terminals of the inductance which is expressed as $aV_1+(1-\alpha)V_2$ must be zero. $V_1$ and $V_2$ are therefore of different signs.

With the average current in the capacitors being zero in a steady-state, the average of $I_L$ is therefore equal to I. The average current in the transistor is equal to $I_1$ and $\alpha I_L$ and therefore to $I_1=\alpha$ I. Similarly, we have $I_2=(1-\alpha)$ I. The duty cycle $\alpha$ therefore makes it possible to adjust the distribution of the current I in the connections 11 and 12, which is the expected effect.

Figure 6B:
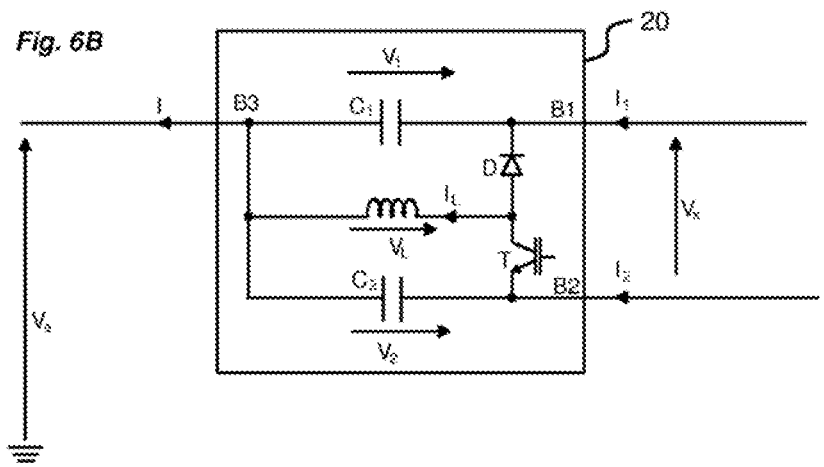

Case where $I_1<0$, $I_2<0$ and $V_x>0$—FIG. 6B

For this case, the positions of the transistor and the diode are exchanged. The operating principle is the same as in the previous case.

Figure 6C:
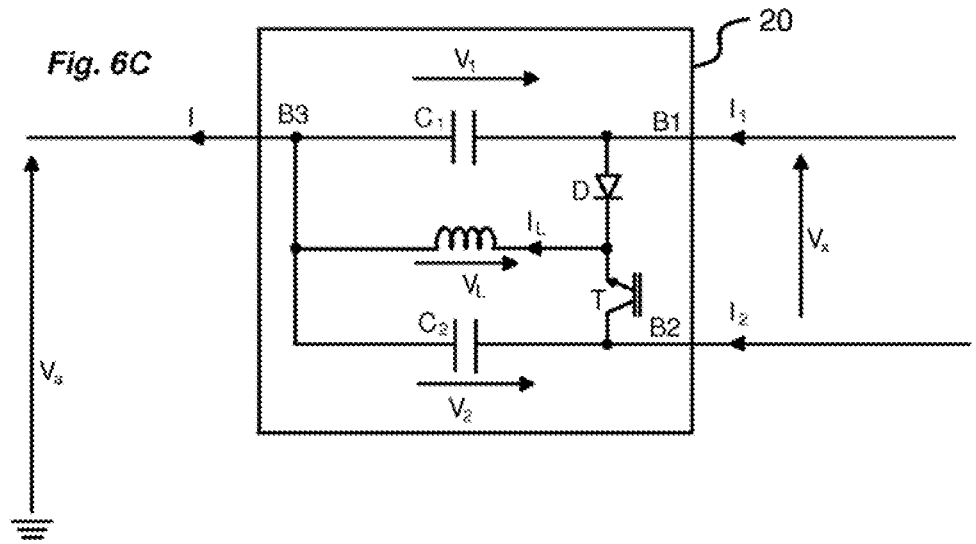

Case where $I_1>0$, $I_2>0$ and $V_x<0$—FIG. 6C

It is a simple adaptation of the previous cases.

Figure 6D:
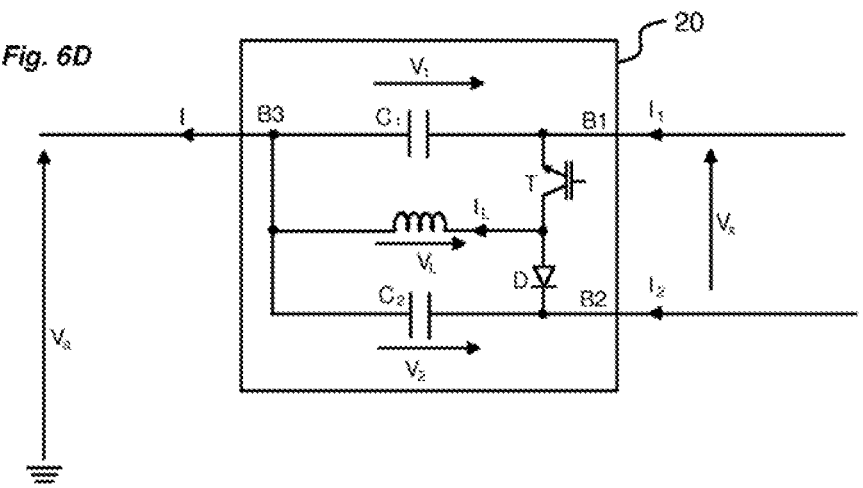

Case where $I_1<0$, $I_2<0$ and $V_x<0$—FIG. 6D

It is a simple adaptation of the previous cases.

Figure 6E:
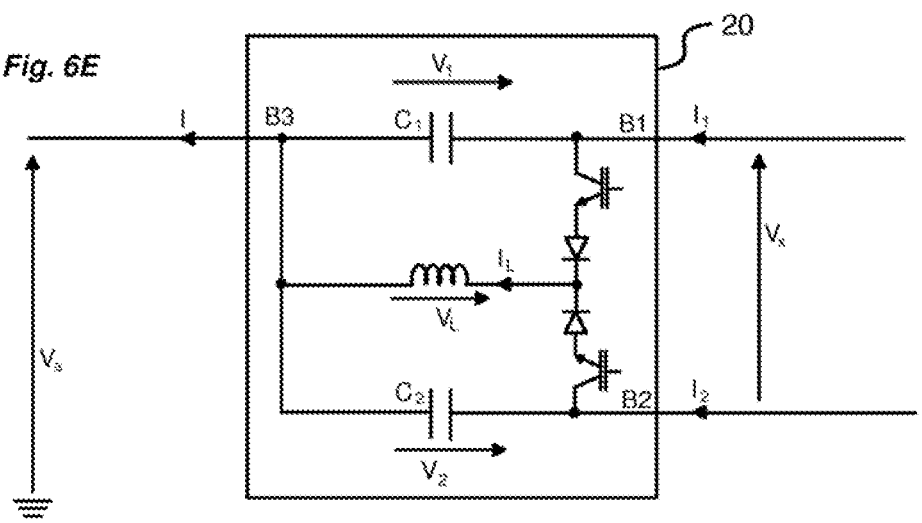

Case where $I_1>0$, $I_2>0$ and $V_x$ is of any sign (the sign of $V_x$ can change during operation)—FIG. 6E $S_1$=Open circuit
$S_2$=IGBT+Diode
$S_3$=IBGT+Diode
$S_4$=Open circuit
$S_5$=Short circuit
$S_6$=Open circuit For this need, the switches must be voltage reversible. Thus, we will use transistors in series with diodes (as shown in FIG. 6E) or symmetrical GTO Thyristors (which support reverse voltage) or symmetrical IGCT Thyristors.

Figure 6F:
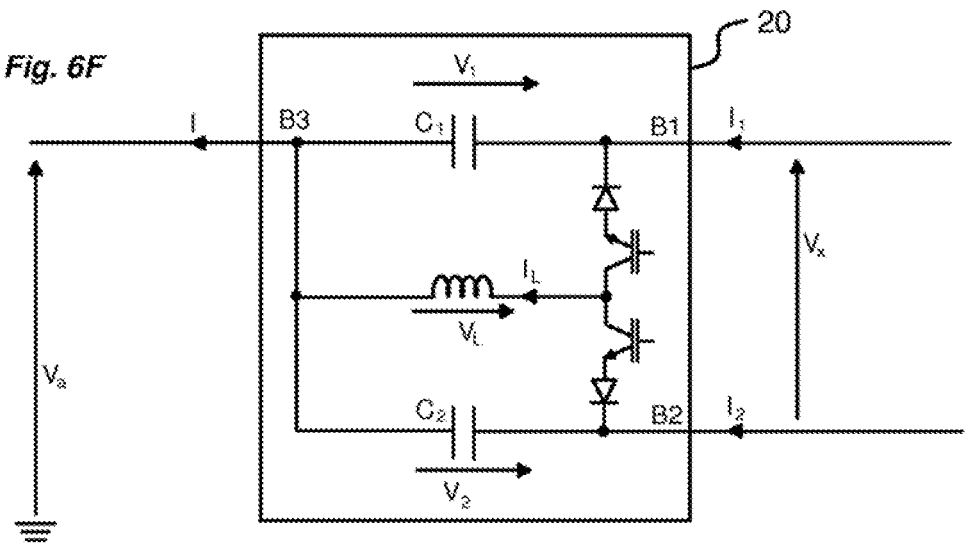

Case where $V_x<0$, $I_2<0$ and $V_x$ is of any sign (the sign of $V_x$ can change during operation)—FIG. 6F It is an adaptation of the previous operation case.

Figure 6G:
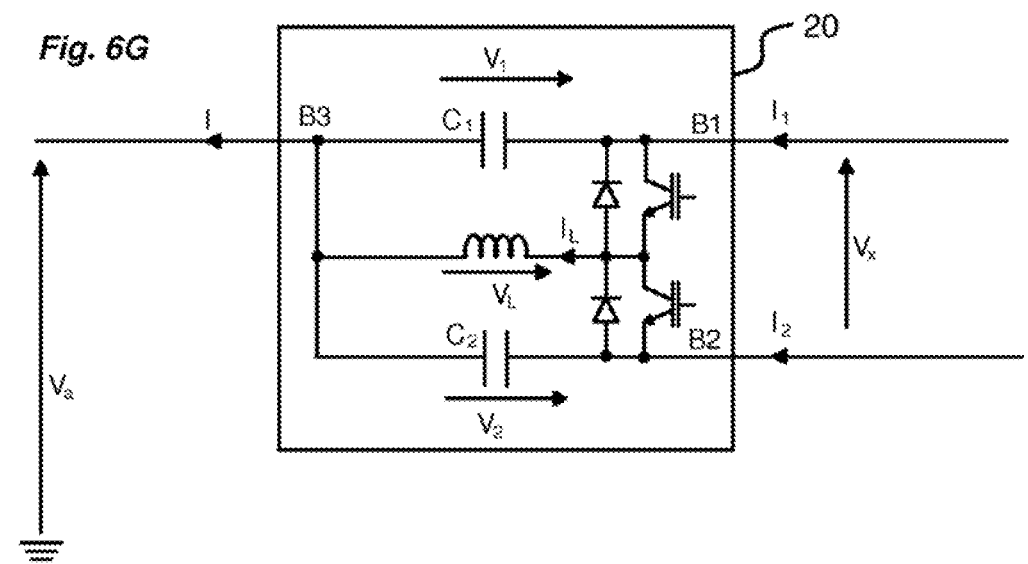

Cases where $V_x>0$ and $I_1$ and $I_2$ are of identical signs which can change ($I_1>0$ and $I_2>0$ or $I_1<0$ and $I_2<0$)—FIG. 6G In this case, the switches are current-reversible but not voltage-reversible. We will use field effect transistors possibly in parallel with diodes or IGBT type transistors in parallel with diodes or GTO type transistors (possibly asymmetrical) in parallel with diodes or IGCT type transistors (possibly asymmetrical) in parallel with diodes.

Figure 6H:
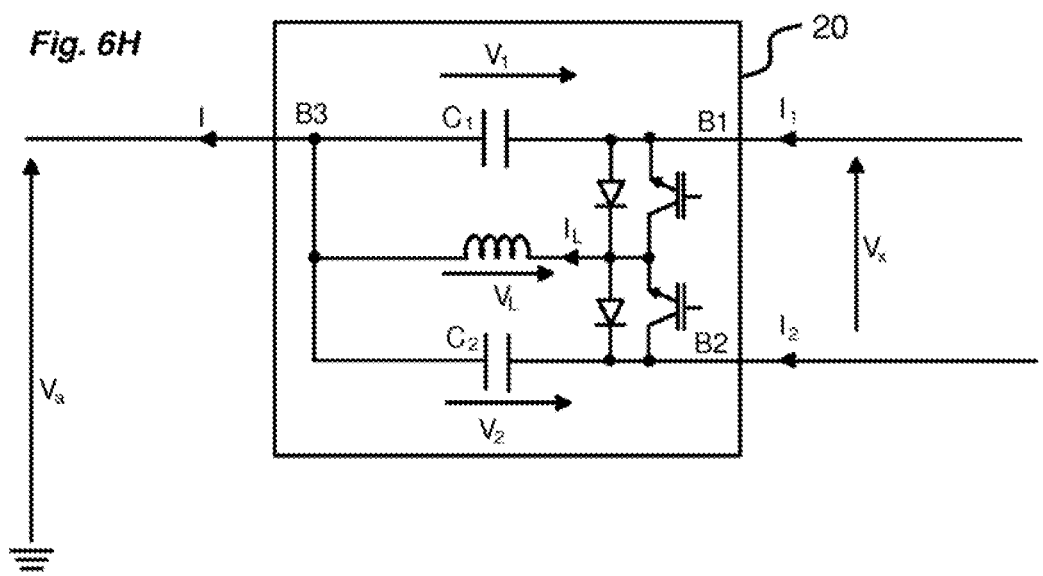

Case where $V_x<0$ and $I_1$ and $I_2$ are of identical signs but which can change ($I_1>0$ and $I_2>0$ or $I_1<0$ and $I_2<0$)—FIG. 6H It is an adaptation of the previous operation case.

Figure 6I:
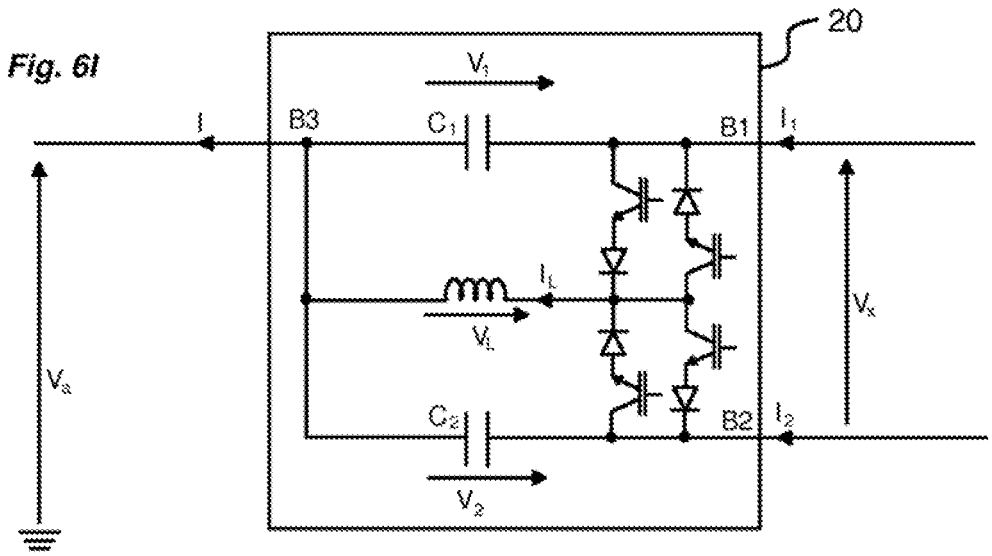

Case where $V_x$ is of any sign and $I_1$ and $I_2$ are of identical signs but which can change ($I_1>0$ and $I_2>0$ or $I_1<0$ and $I_2<0$)—FIG. 6I For this need, we will use voltage and current reversible switches (placed in series and parallel to transistors and diodes or antiparallel to GTO, IGCT or connected in series in opposition to MOSFETs).

A second series of designs presented below relates to the fact that the currents $I_1$ and $I_2$ are always of different signs.

Figure 7A:
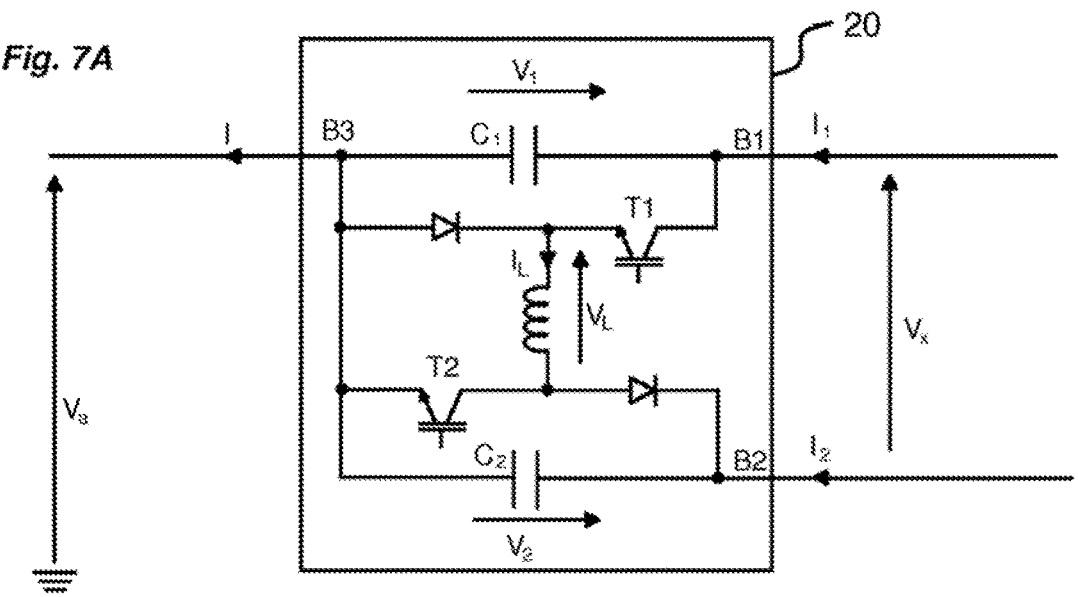
FIGS. 7A to 7K represent several designs of the power flow control device of the invention responding to a second series of needs.

Case where $I_1>0$, $I_2<0$ with I and $V_x$ are of any but different signs (I/Vx<0)—FIG. 7A In this operation case, we then have the following configuration:

$S_1$=Diode
$S_2$=IGBT
$S_3$=Open circuit
$S_4$=Open circuit
$S_5$=IGBT
$S_6$=Diode For this design, a possible control mode is as follows. Transistors $T_1$ and $T_2$ are simultaneously controlled at the closing with a duty cycle α. When the transistors are closed, the voltage $V_L$ is then equal to $V_1$. Assuming that there is continuous conduction ($I_L$ is never zero), when the transistors are controlled at the opening, the diodes start conducting, the voltage $V_L$ is then equal to $-V_2$. The average voltage across the inductor is $aV_1-(1-a)V_2$.

In steady-state, this voltage is zero on average. We therefore have:

$$V_1=(1-a)/aV_2.$$

The voltages $V_1$ and $V_2$ are therefore of the same sign (necessarily positive considering the switches chosen here) and the voltage inserted in the network mesh is:

$$V_x=V_1-V_2=(1-2a)/(1-a)V_1=(1-2a)/aV_2$$

This voltage therefore changes sign depending on whether a is greater than 0.5 or not.

In steady-state, the average current in the capacitors is zero. The average current in the transistor $T_1$ (which is transmitting a fraction of a in the period) is equal to $I_1$ (actually $I_1/\alpha$ when conducting and 0 the rest of the time). When the transistor $T_1$ is conducting, the current flowing through it is equal to $I_L$. We therefore find that $I_1/0$ and $I_L$ are equal. Similarly, $-I_2/(1-\alpha)$ and $I_L$ are equal. We therefore have:

$$I_1=aI_2/(1-\alpha)$$

This last result clearly shows that the currents $I_1$ and $I_2$ must therefore be of opposite signs.

Since $I=I_1+I_2$, we deduce that:

$$I_1=-(1-2\alpha)/\alpha I \text{ and } I_2=(1-2\alpha)/(1-\alpha)I$$

It can therefore be seen that the adjustment of the duty cycle a makes it possible to adjust the distribution of the current I between the links 11 and 12, which is the expected effect.

We also note that current I (current in converter station A) can change sign even if the direction of the current in links 11, 12 does not change. The design presented here works for $V_1$, $V_2$, $I_1$ positive and $I_2$ negative, with the value of a enabling the distribution of the current of the converter station between links 11 and 12. The current I in the converter station A and the voltage inserted in the mesh Vx can change sign but we must always have I/Vx<1 (signs of any value but different) because $V_x=(1-2\alpha)/\alpha V_2$ and $I=-\alpha/(1-2\alpha)I_1$ and the switches were chosen for $V_2>0$ and $I_1>0$. Therefore:

Either $V_x>0$ and I<0 making α<0.5;

Or $V_x<0$ and I>0 making α>0.5.

Figure 7B:
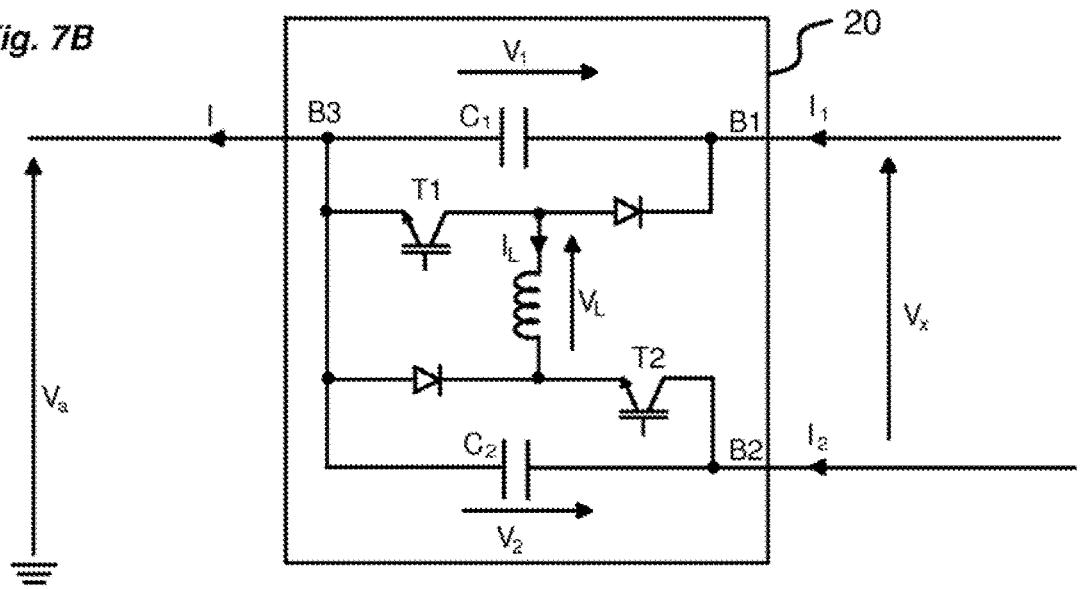

Case where $I_1<0$, $I_2>0$ with I and $V_x$ are of any but different signs (I/$V_x$<0)—FIG. 7B The operating principle is the same as in the previous case. It is just a question of swapping indices 1 and 2 of the different parameters.

Figure 7C:
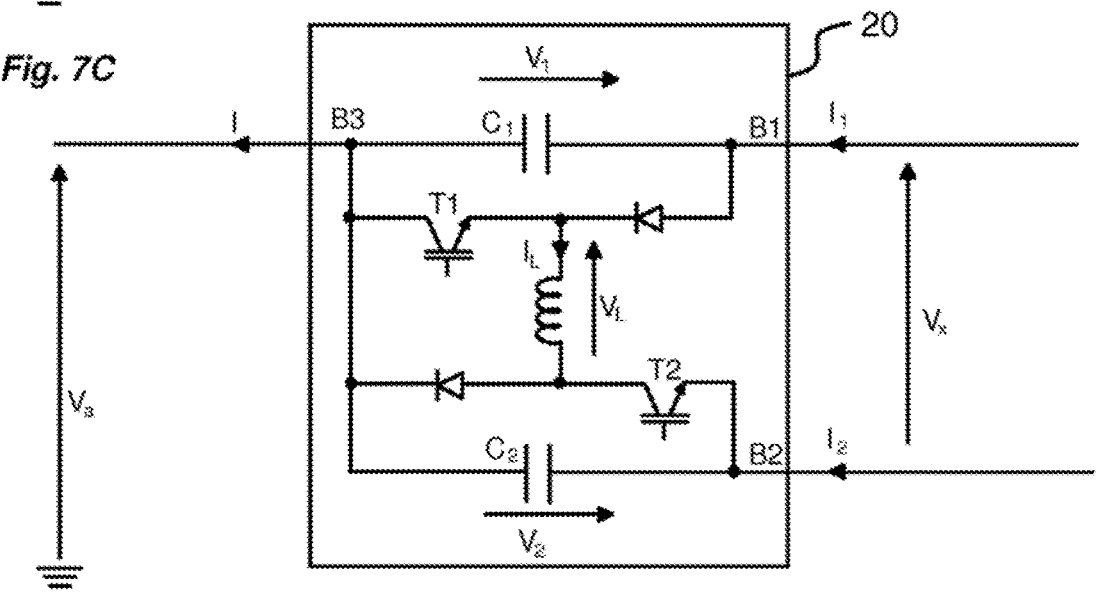

Case where $I_1>0$, $I_2<0$ with I and $V_x$ are of any but identical signs (I/$V_x$>0)—FIG. 7C The operating principle is the same as in the two previous cases, except that $V_1$ and $V_2$ are negative.

Figure 7D:
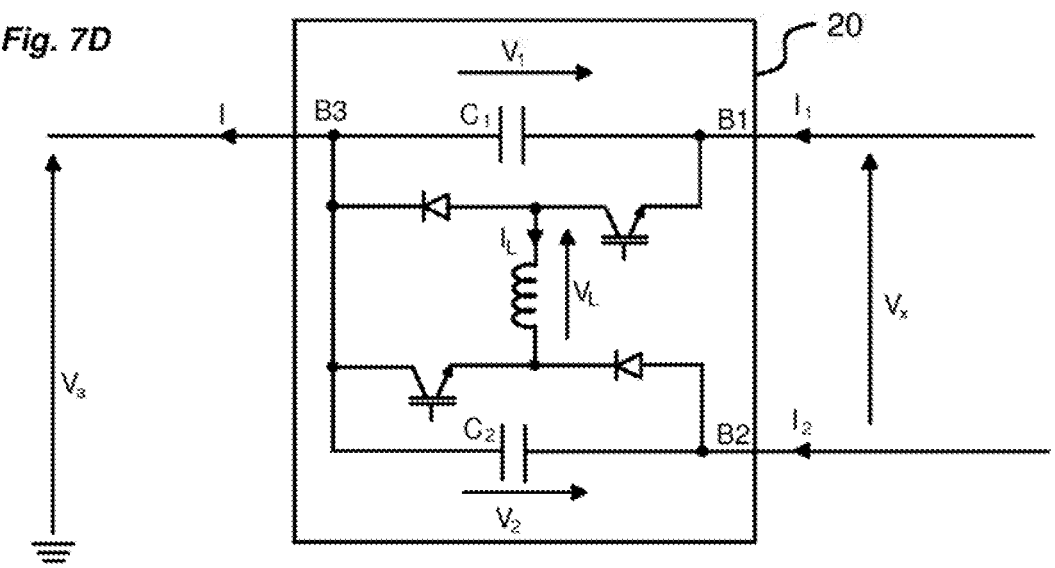

Case where $I_1<0$, $I_2>0$ with I and $V_x$ are of any but identical signs (I/Vx>0)—FIG. 7D It is an adaptation of the previous design.

Figure 7E:
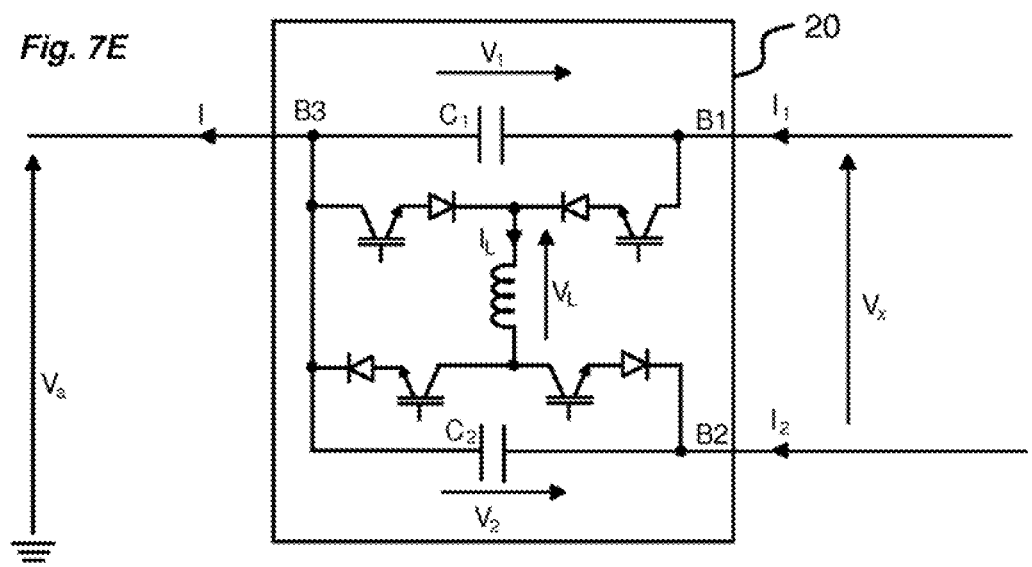

Case where $I_1>0$, $I_2<0$ and I and Vx are of any sign (the I/$V_x$ ratio can change signs)—FIG. 7E The operating principle is the same but $V_1$ and $V_2$ change sign depending on the voltage $V_x$ inserted. Voltage reversible switches are therefore chosen.

Figure 7F:
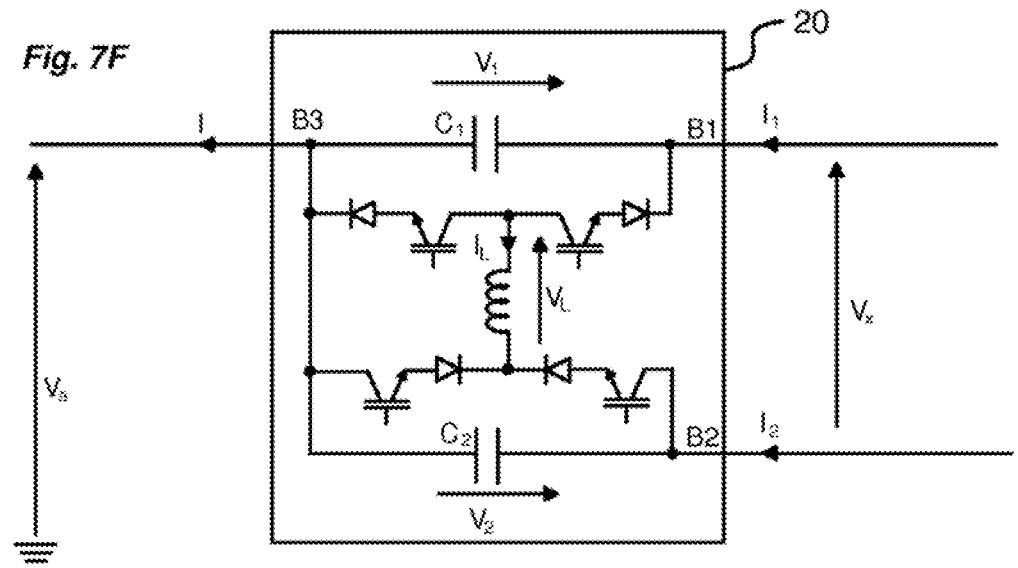

Case where $I_1<0$, $I_2>0$ and I and $V_x$ are of any sign—FIG. 7F

It is an adaptation of the previous design.

Figure 7G:
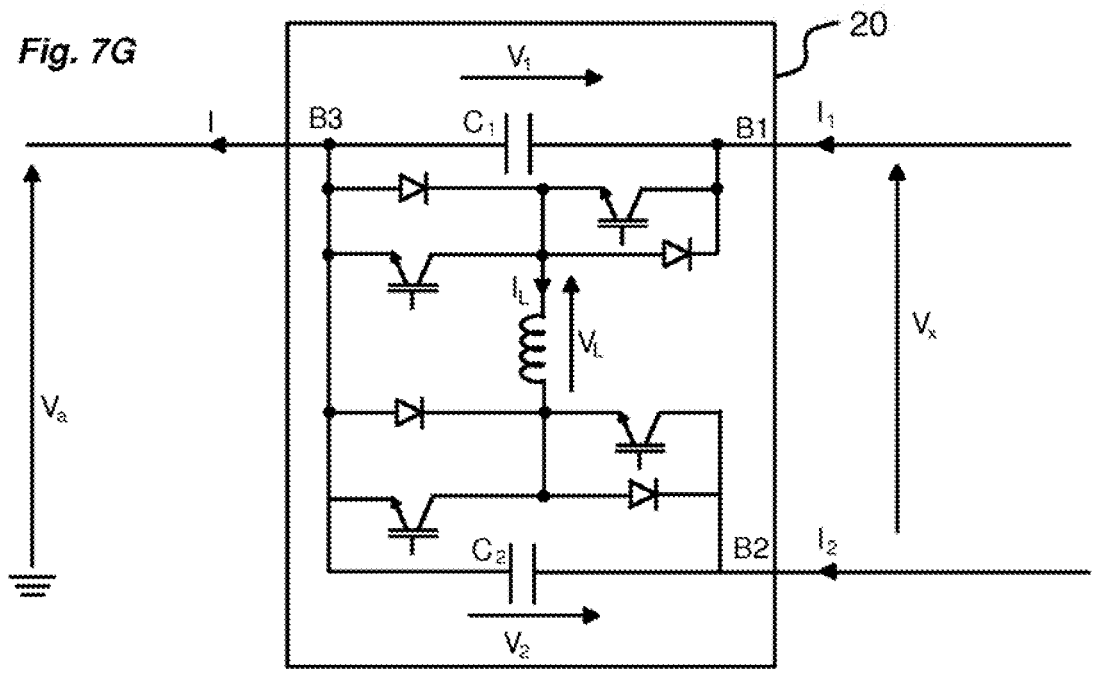

Case where I/Vx>0 and $I_1$ and $I_2$ are of signs which can change but with $I_1$ and $I_2$ always of opposite signs ($I_1/I_2<0$)—FIG. 7G In this design, each switch is replaced by the association of a transistor and a diode in parallel. The switches are placed adjacent to one another to ensure the operation adapts as required.

Figure 7H:
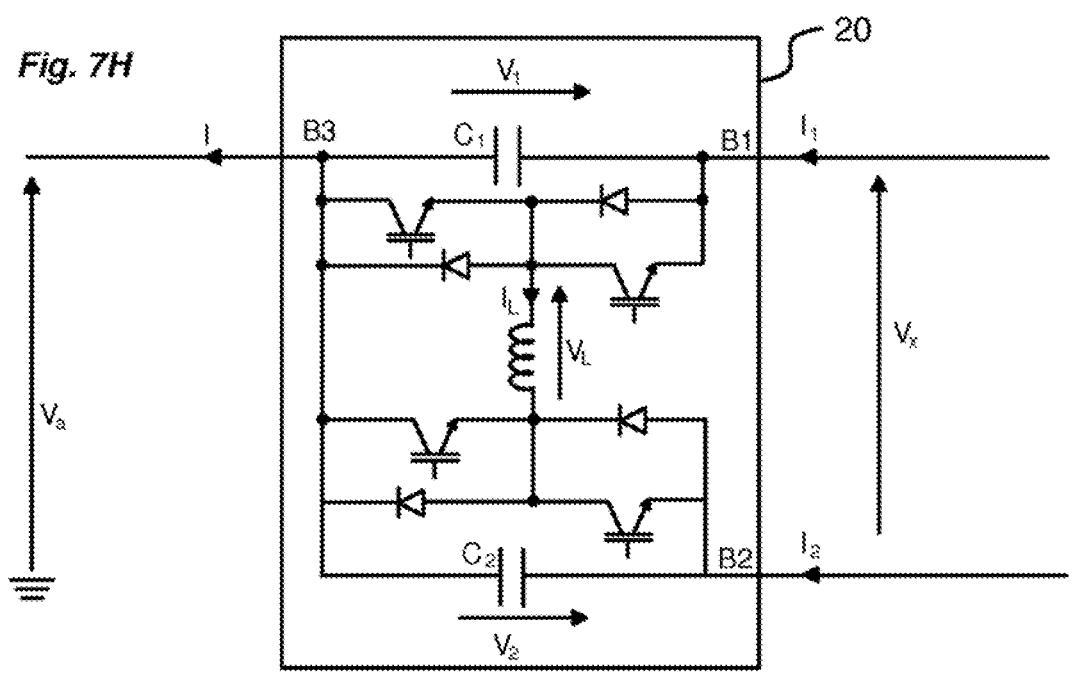

Case where $I/V_x<0$ and $I_1$ and $I_2$ are of signs which can change but with $I_1$ and $I_2$ always of opposite signs ($I_1/I_2<0$)—FIG. 7H It is an adaptation of the previous design.

Figure 7I:
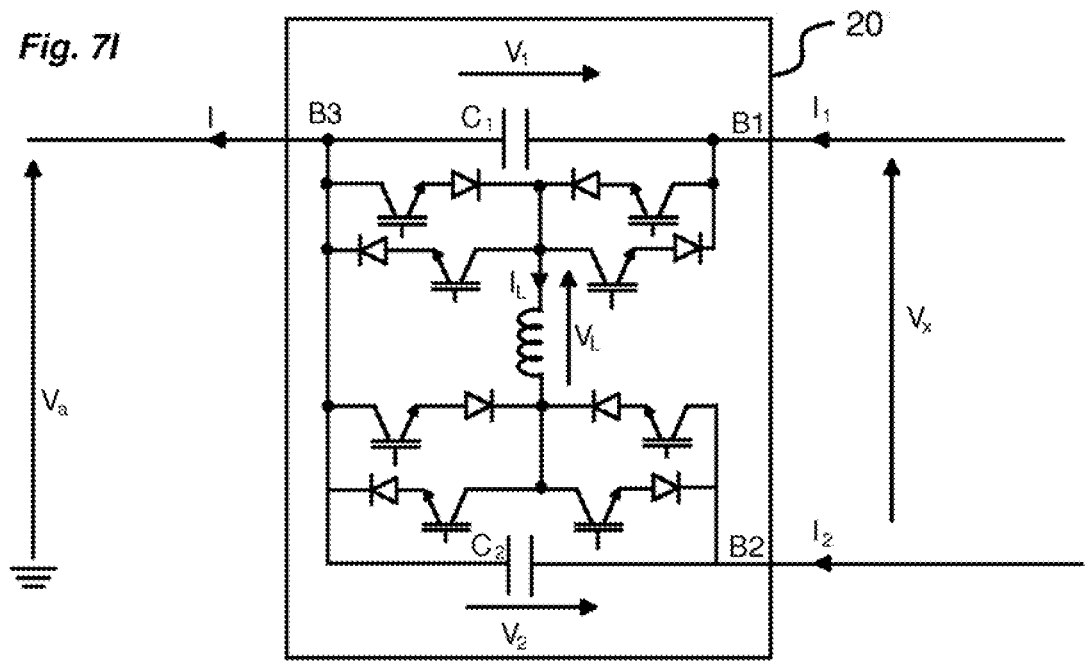

Case where $V_x$ and any I and $I_1$ and $I_2$ are of signs which can change but with $I_1$ and $I_2$ always of different signs ($I_1/I_2<0$)—FIG. 7I In this design, each switch is replaced by the association of two transistors and two diodes so as to produce a current and voltage reversible switch. The switches are arranged to ensure the operation adapts as required.

Figure 7J:
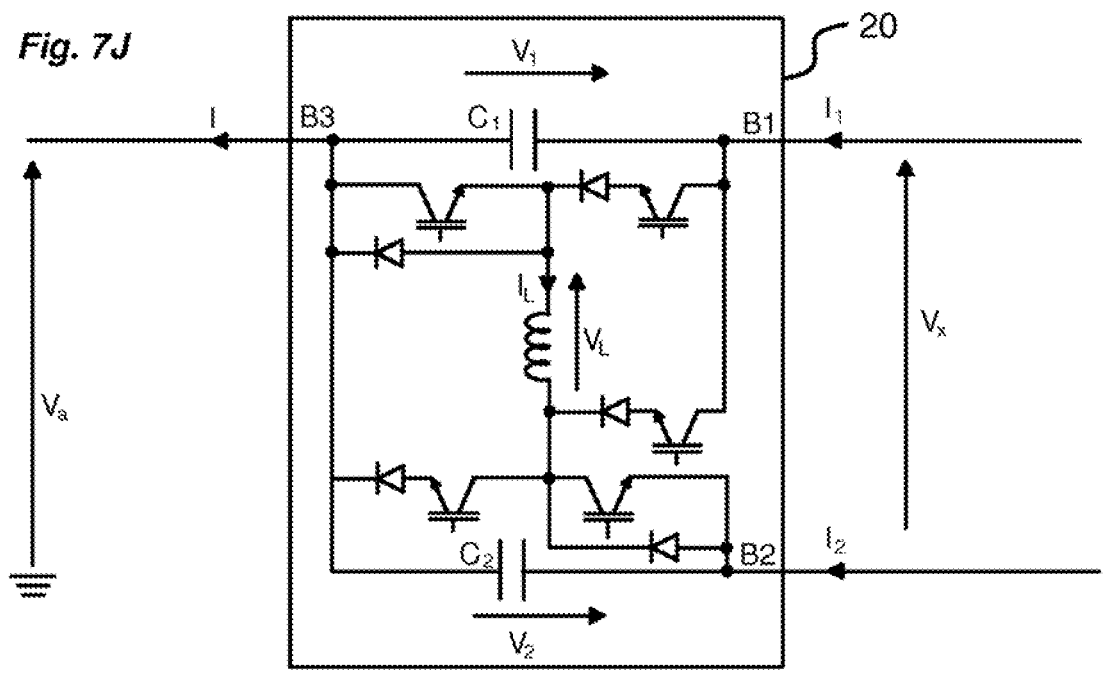

Case where $I_1>0$, $I_2$ are of any sign, $V_x>0$ and $I>0$—FIG. 7J

For this need, we have the following configuration:
$S_1$=IGBT and diode in parallel
$S_2$=IGBT and Diode in series
$S_3$=Open circuit
$S_4$=IGBT and Diode in series
$S_5$=IGBT and Diode in series
$S_6$=IGBT and diode in parallel Here, the converter is represented according to the preceding principle suitable for the case where $I_1$, $V_x$ and I are positive and $I_2$ is of a sign that can change. In this case, the switch $S_3$ is not used.

Figure 7K:
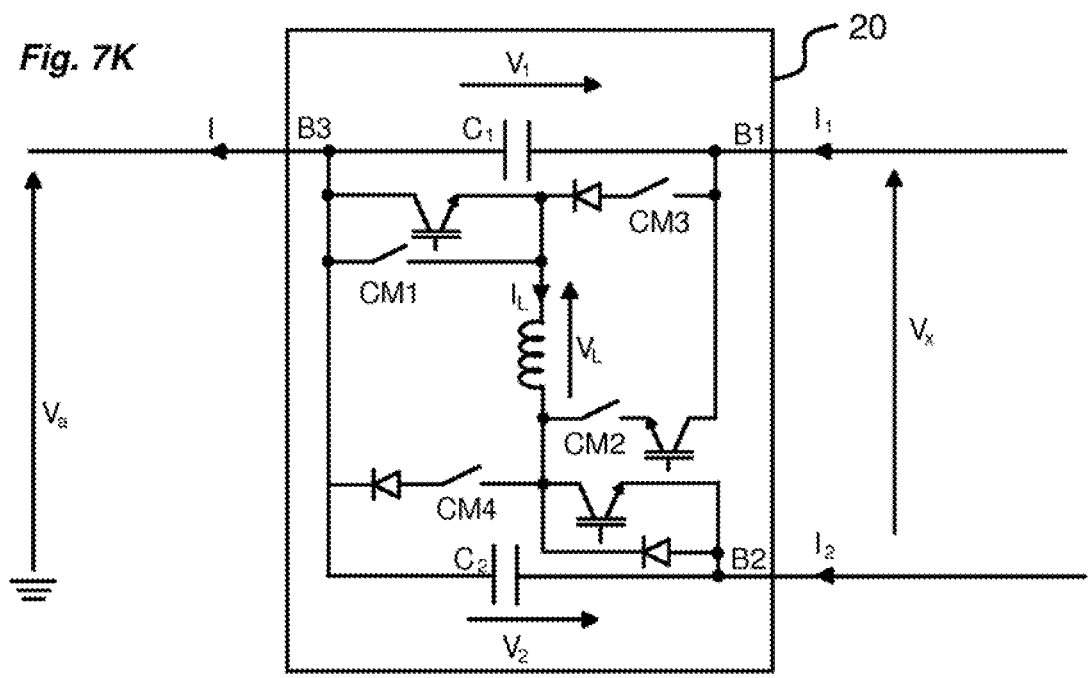

Furthermore, in certain designs, it will also be possible to replace transistors with a simple mechanical contact, especially when one of the currents $I_1$ or $I_2$ changes sign. FIG. 7K thus represents an optional design of the architecture of FIG. 7J, in which certain transistors and diodes have been replaced by a mechanical contact. This solution makes it possible to reduce the losses in the conduction state and the number of semiconductor components.

When the mechanical contacts CM1 and CM2 are closed, the contacts CM3 and CM4 are open and vice versa. In the first case, the operation is identical to that of the design of FIG. 6A. In the second case, the operation is identical to that of the design of FIG. 7C.

Of course, as mentioned above, it must be understood that there are still other possible designs, not described in the present application but which result, like those already described above, from an adaptation of the general architecture of the device represented in FIG. 5.

Figure 8:
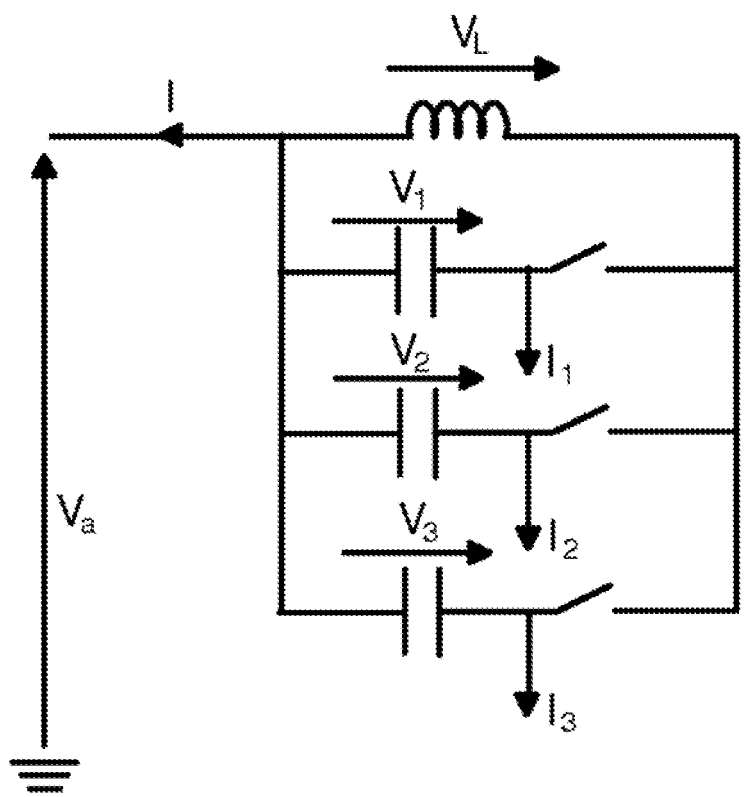
FIG. 8 represents an evolution of the device of the invention in a more complex mesh network.

With reference to FIG. 8, it should also be understood that the structure of the device can be extended to a mesh network in which more than two links are connected to the converter station A. In FIG. 8, three links are thus connected to the converter station A, on which the currents 11, 12 and 13 flow respectively. In this figure, the switches are represented generically and can therefore adopt an architecture that suits the operating case taking into account the possible signs of the different currents and different voltages involved.

According to another feature of the invention, it is also possible to provide a so-called "bypass" system (that is to say circumvent) of the power flow control device of the invention, in order to bypass it when it is not useful. The "bypass" system avoids the complete powering-off of the network.

Figure 9:
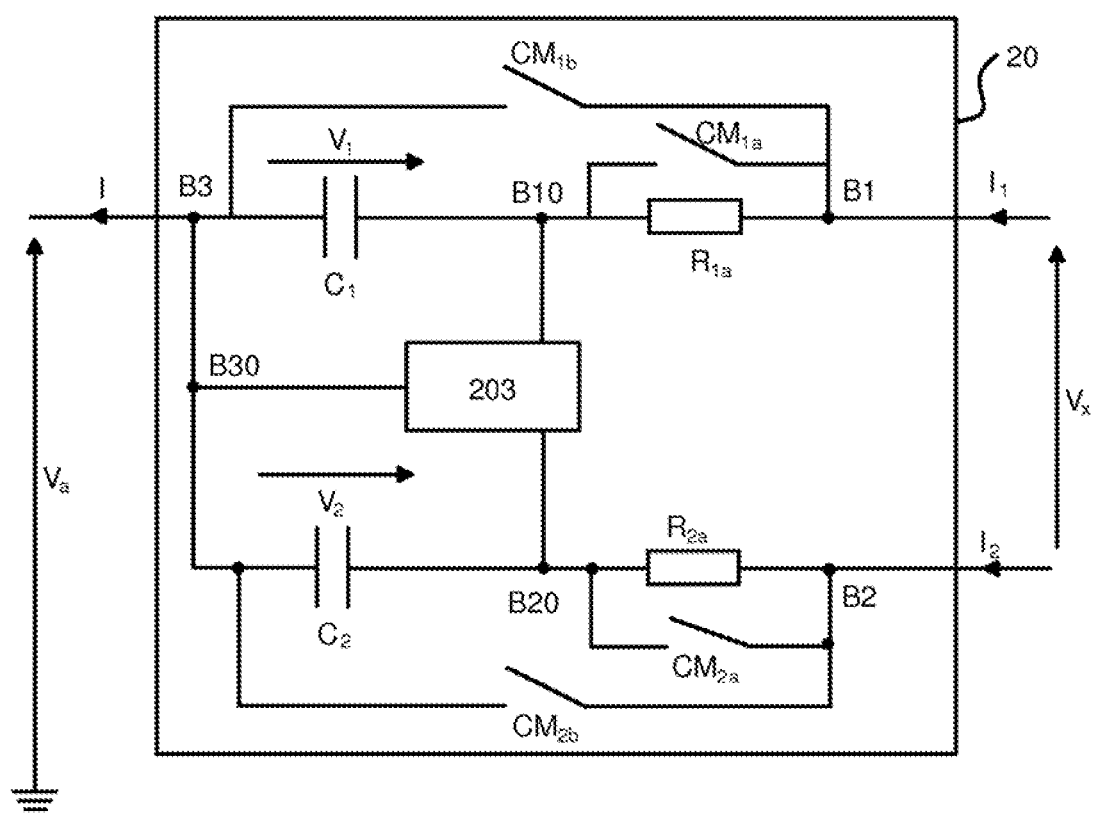
FIG. 9 shows a "bypass" system used in the device of the invention.

This system is visible in FIG. 9. This system is an advantageous part of the power flow control system. The control means 21 of the device are configured to control this bypass system.

In FIG. 9, the switching means and inductance are shown in the same converter block 203 comprising a terminal B30 connected to the terminal B3, a terminal B10 connected to the capacitor C1 and a terminal B20 connected to the capacitor C2.

The "bypass" system is comprised of a first resistor R1$a$ whose role is to discharge the capacitor C1 and a second resistor R2$a$ meant to discharge the second capacitor C2. The first resistor R1$a$ is connected on the one hand to the first terminal B1 and to the terminal B10. The second resistor R2$a$ is connected on the one hand to the second terminal B2 and to the terminal B20. A first switch $CM_{1a}$ is connected in parallel with the first resistor R1$a$ and a second switch $CM_{2a}$ is connected in parallel with the second resistor R2$a$. A switch $CM_{1b}$ is connected between the first terminal B1 and the third terminal B3. Another switch $CM_{2b}$ is connected between the second terminal B2 and the third terminal B3.

The switches $CM_{1a}$, $CM_{1b}$, $CM_{2a}$ and $CM_{1b}$ can be obtained through the use of mechanical contactors. The device that operates these switches is not shown here.

When the power flow control device is not in use (state 1):
switches $CM_{1b}$ and $CM_{2b}$ are closed;
switches $CM_{1a}$ and $CM_{2a}$ can be in any mode in steady-state.

When the power flow control device is in use (state 2):
switches $CM_{1a}$ and $CM_{2a}$ are closed (so that the network currents do not pass through the discharge resistors, which would create power losses);
switches $CM_{1b}$ and $CM_{2b}$ are opened.

To switch from state 1 to state 2, switches $CM_{1a}$ and $CM_{2a}$ are closed while switches $CM_{1b}$ and $CM_{2b}$ are opened.

To switch from state 2 to state 1, switches $CM_{1a}$ and $CM_{2a}$ are opened while switches $CM_{1b}$ and $CM_{2b}$ are closed.

As a result, the power flow control device is short-circuited and the capacitors are discharged into the resistors. After the unloading of the capacitors, switches $CM_{1a}$ and $CM_{2a}$ can be closed to prepare for the next power up.

The proposed solution ensures that the current in the links is never interrupted. The sequence to switch from one state to another is performed in such a way that the capacitors are not short-circuited.

In an alternative design, the control applied to the switching means of the power flow control device can cancel the voltage across the capacitors (by acting on the duty cycles). If this control functionality is implemented, resistors and switches $CM_{1a}$ and $CM_{2a}$ can be omitted and only switches $CM_{1b}$ and $CM_{2b}$ will be maintained.

From the above statement, it is understood that the invention solution has a number of advantages. It makes it possible to increase the transport capacity of direct current mesh networks, avoiding the congestion of links without the need to integrate new links.

In addition, the invention solution can be used to perform the following functions:
It can also be used to distribute the currents in the networks in order to minimize losses in the network.
As the invention makes it possible to control the current at the level of the links, it can be used to cancel the current in a link. This is useful if a contactor needs to be opened for the reconfiguration of the network.
In the case of a mixed network (bipolar/monopolar ("tap converters" inserted in a bipolar network) for example), the invention can be used to balance the currents in the links.

It should also be noted that no part of the device is subjected to the voltage that exists between the conductors of the links and the ground (as is the case in previous solutions). The voltages that must reach the terminals of the device are of the order of magnitude of the voltage drops that exist in the considered mesh network ($R_1I_1-R_2I_2+R_3I_3$ for the example being considered), this will involve voltages lower than those between the conductors of the links and the ground (e.g. $V_a$). Moreover, the device does not exchange energy with the alternative network and there is no insulation problem with the latter. It is therefore a converter that is placed at a high potential in relation to the earth but does not receive very high voltages at its terminals.

The invention claimed is:

1. A power flow control device for use in a direct current mesh network, a mesh comprised of three nodes, each having a predetermined voltage and three links where a first link connects a first node to a second node, a second link connects the first node to a third node while a third link connects the second node to the third node, said device comprising:
   a first terminal (B1) connected in series to the first link, a second terminal (B2) connected in series to the second link and a third terminal (B3) connected to the first node,
   a first capacitor (C1) connected between the first terminal (B1) and the third terminal (B3),
   at least one second capacitor (C2) connected between the second terminal (B2) and the third terminal (B3),
   at least one inductor (L) alternately connected to the first capacitor and the at least one second capacitor and configured to provide energy transfer between the first capacitor and the at least one second capacitor,
   switching means arranged to allow for an alternating connection of the at least one inductor in parallel with the first capacitor or in parallel with the at least one second capacitor, said switching means including:
      a first set of two first switches ($S_1$, $S_2$) connected between the first terminal (B1) and the third terminal (B3) of the device, in parallel with the first capacitor, both switches ($S_1$, $S_2$) of the first set establishing a first connection midpoint between them;
      a second set of two second switches ($S_5$, $S_6$) connected between the second terminal (B2) and the third terminal (B3), in parallel with the at least one second capacitor, both switches ($S_5$, $S_6$) of the second set establishing a second connection midpoint between them;
      a third switch (S3) connected between the second terminal (B2) and the first midpoint of the first set of switches;
      a fourth switch (S4) connected between the first terminal (B1) and the second midpoint of the second set of switches;
   control means (21) configured to control said switching means to establish the said connection of the said at least one inductor (L) alternately, in parallel with the first capacitor or in parallel with the at least one second capacitor and controlling transfer of energy between the first capacitor and the at least one second capacitor via said at least one inductor (L).

2. The device according to claim 1, further having the inductor (L) connected between the first midpoint and the second midpoint.

3. The device according to claim 1 wherein each switch is selected according to a sign of the following parameters:
   a current $I_1$;
   a current $I_2$;
   a ratio $I_1/I_2$ ;
   a difference $I_1$-$I_2$
   a difference $V_x$=$V_1$ -$V_2$ ;
   a ratio
   $$\frac{V1-V2}{I1+I2};$$
   In which:
      $I_1$ corresponds to the current flowing in the first link;
      $I_2$ corresponds to the current flowing in the second link;
      $V_1$ corresponds to the voltage at the terminals of the first capacitor;
      $V_2$ corresponds to the voltage at the terminals of the second capacitor.

4. The device according to claim 3, wherein each switch is selected from the group consisting of:
   an open circuit;
   a short circuit;
   a diode;
   a non-reversible control switch;
   a current reversible control switch;
   a voltage reversible control switch;
   a current and voltage reversible control switch;
   a single mechanical switch;
   a mechanical switch in series with a diode;
   a mechanical switch in series with a control switch.

5. The device according to claim 1, wherein the switching means and the inductor are distributed in several identical converter blocks, and wherein the device comprises a first converter block separately connected to the first terminal (B1), to the second terminal (B2) and to the third terminal (B3).

6. The device according to claim 1, further comprising an integrated bypass system, controlled by the said control means and including an adjacent switching means in parallel with each capacitor.

7. The device according to claim 6, wherein said bypass system has a control means for discharging of each capacitor.

8. The device according to claim 1, wherein the said network comprises the at least three nodes which each operate at a specific voltage and the three links; where the first link connects the first node to the second node, the second link connects the first node to the third node and the third link connects the second node to the third node.

9. A power flow control device for use in an electrical current mesh network, a mesh comprised of three nodes, each having a predetermined voltage and three links where a first link connects a first node to a second node, a second link connects the first node to a third node while a third link connects the second node to the third node, said device comprising:
   a first terminal (B1) connected in series to the first link, a second terminal (B2) connected in series to the second link and a third terminal (B3) connected to the first node,
   a first voltage being provided between the first terminal (B1) and the third terminal (B3) by a first capacitor ($C_1$),
   a second voltage being provided between the second terminal (B2) and the third terminal (B3) by at least a second capacitor ($C_2$);
   an electrical current alternately connected to the first voltage and the second voltage and configured to provide energy transfer between the first voltage and the second voltage, the electrical current having at least one inductor (L);
   switching means arranged to allow for an alternating connection of the electrical current in parallel with the first voltage or in parallel with the second voltage, said switching means including:
a first set of two first switches ($S_1$, $S_2$) connected between the first terminal (B1) and the third terminal (B3) of the device, in parallel with the first voltage, both switches ($S_1$, $S_2$) of the first set establishing a first connection midpoint between them;
a second set of two second switches ($S_5$, $S_6$) connected between the second terminal (B2) and the third terminal (B3), in parallel with the second voltage, both switches ($S_5$, $S_6$) of the second set establishing a second connection midpoint between them;
a third switch (S3) connected between the second terminal (B2) and the first midpoint of the first set of switches;
a fourth switch ($S_4$) connected between the first terminal (B1) and the second midpoint of the second set of switches;
control means (21) configured to control said switching means to establish the connection of the electrical current alternately, in parallel with the first voltage or in parallel with the second voltage and controlling transfer of energy between the first voltage and the second voltage via said electrical current.

* * * * *